United States Patent
Allidieres

(10) Patent No.: US 12,553,576 B2
(45) Date of Patent: Feb. 17, 2026

(54) FLUID STORAGE AND SUPPLY DEVICE, AND VEHICLE AND METHOD COMPRISING SUCH A DEVICE

(71) Applicant: L'Air Liquide, Societe Anonyme pour l'Etude et l'Exploitation des Procedes Georges Claude, Paris (FR)

(72) Inventor: Laurent Allidieres, Paris (FR)

(73) Assignee: L'Air Liquide, Societe Anonyme Pour l'Etude et l'Exploitation des Procedes Georges Claude, Paris (FR)

(*) Notice: Subject to any disclaimer, the term of this patent is extended or adjusted under 35 U.S.C. 154(b) by 313 days.

(21) Appl. No.: 18/286,337

(22) PCT Filed: Mar. 30, 2022

(86) PCT No.: PCT/EP2022/058396
§ 371 (c)(1),
(2) Date: Oct. 10, 2023

(87) PCT Pub. No.: WO2022/218704
PCT Pub. Date: Oct. 20, 2022

(65) Prior Publication Data
US 2024/0183497 A1    Jun. 6, 2024

(30) Foreign Application Priority Data
Apr. 13, 2021 (FR) .............................. 2103776

(51) Int. Cl.
*F17C 7/04* (2006.01)
(52) U.S. Cl.
CPC ........ *F17C 7/04* (2013.01); *F17C 2201/0109* (2013.01); *F17C 2201/035* (2013.01);
(Continued)

(58) Field of Classification Search
CPC ............. Y02E 60/32; F17C 2201/0109; F17C 2201/035; F17C 2201/054;
(Continued)

(56) References Cited

U.S. PATENT DOCUMENTS

| 5,644,921 A | 7/1997 | Chowdhury |
| 8,113,006 B2 * | 2/2012 | Rech .................. F17C 7/02 |
| | | 62/50.3 |

(Continued)

FOREIGN PATENT DOCUMENTS

| EP | 1 521 933 | 12/2009 |
| EP | 2 813 746 | 12/2014 |
| FR | 2 706 822 | 12/1994 |

OTHER PUBLICATIONS

International Search Report and Written Report for PCT/EP2022/058396, mailed Aug. 17, 2022.
French Search Report for FR 2 103 776, mailed Jan. 14, 2022.

*Primary Examiner* — Filip Zec
(74) *Attorney, Agent, or Firm* — Justin K. Murray

(57) ABSTRACT

A fluid storage and supply device comprising a cryogenic reservoir for storing liquefied fluid, a withdrawing circuit comprising a first withdrawing pipe having a first upstream end connected to the upper part of the reservoir and a second downstream end intended to be connected to a user member, the first withdrawing pipe comprising a first heating heat exchanger situated outside the reservoir and a second heating heat exchanger situated inside the reservoir, the withdrawing circuit comprising a set of valve(s) configured to ensure the passage of a flow of fluid circulating from the first end towards the second end by passing through the first heat exchanger and then through the second heat exchanger or by passing solely through the first heat exchanger without passing through the second heat exchanger, characterized in that the device further comprises a system for pressurizing (Continued)

the reservoir comprising a pressurizing pipe separate from the withdrawing circuit and comprising two ends respectively connected to the upper and lower parts of the reservoir, a vaporizing heat exchanger and a set of valve(s) configured to allow the withdrawal of liquid from the reservoir, the heating thereof in the vaporizing heat exchanger and the reintroduction thereof into the reservoir.

13 Claims, 1 Drawing Sheet

(52) U.S. Cl.
CPC  *F17C 2201/054* (2013.01); *F17C 2203/0391* (2013.01); *F17C 2203/0629* (2013.01); *F17C 2205/0326* (2013.01); *F17C 2205/0332* (2013.01); *F17C 2205/0352* (2013.01); *F17C 2221/012* (2013.01); *F17C 2223/043* (2013.01); *F17C 2225/0161* (2013.01); *F17C 2225/035* (2013.01); *F17C 2227/0107* (2013.01); *F17C 2227/0311* (2013.01); *F17C 2227/0316* (2013.01); *F17C 2227/0374* (2013.01); *F17C 2227/0393* (2013.01); *F17C 2250/032* (2013.01); *F17C 2250/043* (2013.01); *F17C 2250/0439* (2013.01); *F17C 2270/0105* (2013.01); *F17C 2270/0184* (2013.01)

(58) Field of Classification Search
CPC ........ F17C 2201/056; F17C 2203/0391; F17C 2203/0629; F17C 2205/0326; F17C 2205/0332; F17C 2205/035; F17C 2205/0352; F17C 2221/012; F17C 2223/0161; F17C 2223/033; F17C 2223/043; F17C 2225/0123; F17C 2225/0161; F17C 2225/035; F17C 2227/0107; F17C 2227/0306; F17C 2227/0311; F17C 2227/0316; F17C 2227/0374; F17C 2227/0393; F17C 2250/032; F17C 2250/043; F17C 2250/0439; F17C 2265/066; F17C 2270/0105; F17C 2270/0171; F17C 2270/0184; F17C 2270/0189; F17C 7/04
See application file for complete search history.

(56) References Cited

U.S. PATENT DOCUMENTS

| | | | |
|---|---|---|---|
| 9,746,132 B2 | 8/2017 | Gustafson et al. | |
| 10,125,751 B2* | 11/2018 | Johnson | F04B 15/08 |
| 10,495,257 B2* | 12/2019 | Mathison | F17C 5/007 |
| 10,775,080 B2* | 9/2020 | Frantz | F17C 5/06 |
| 11,300,248 B2* | 4/2022 | Frère | F17C 5/02 |
| 11,920,737 B2* | 3/2024 | Bensadoun | F17C 13/04 |
| 2006/0162811 A1* | 7/2006 | Roach | F17C 5/007 141/325 |
| 2009/0288426 A1 | 11/2009 | Lilletvedt et al. | |
| 2014/0013777 A1* | 1/2014 | Sun-hae | F17C 13/004 62/50.2 |
| 2014/0190187 A1* | 7/2014 | Snyder | F17C 13/025 62/49.1 |
| 2015/0072260 A1 | 3/2015 | Brunner et al. | |
| 2017/0191619 A1* | 7/2017 | Snyder | F17C 5/04 |
| 2017/0343159 A1* | 11/2017 | Råholm | F16L 59/153 |
| 2018/0306383 A1 | 10/2018 | Poag et al. | |

* cited by examiner

[Fig. 1]
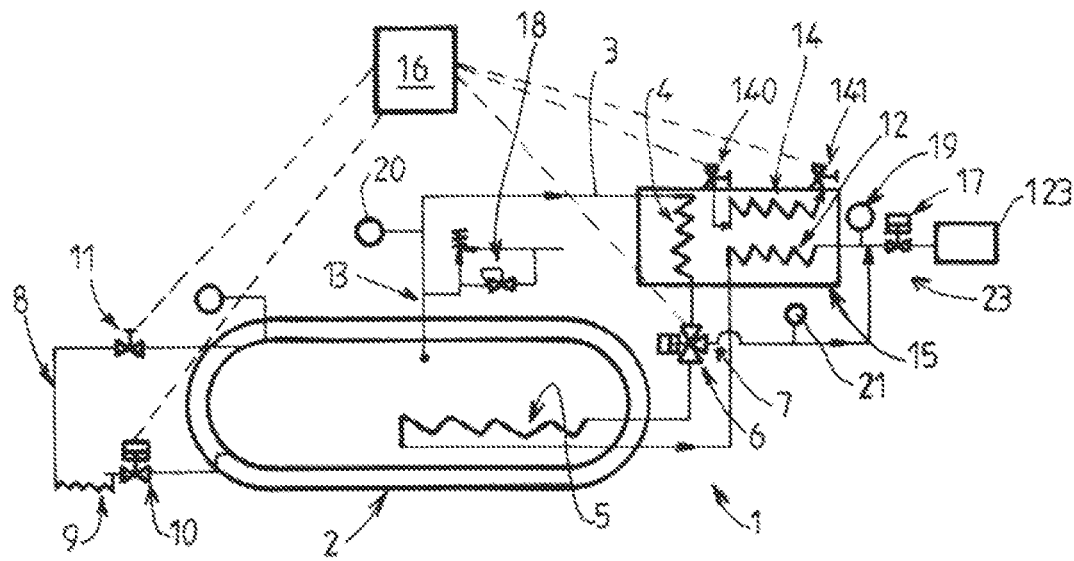
[Fig. 2]
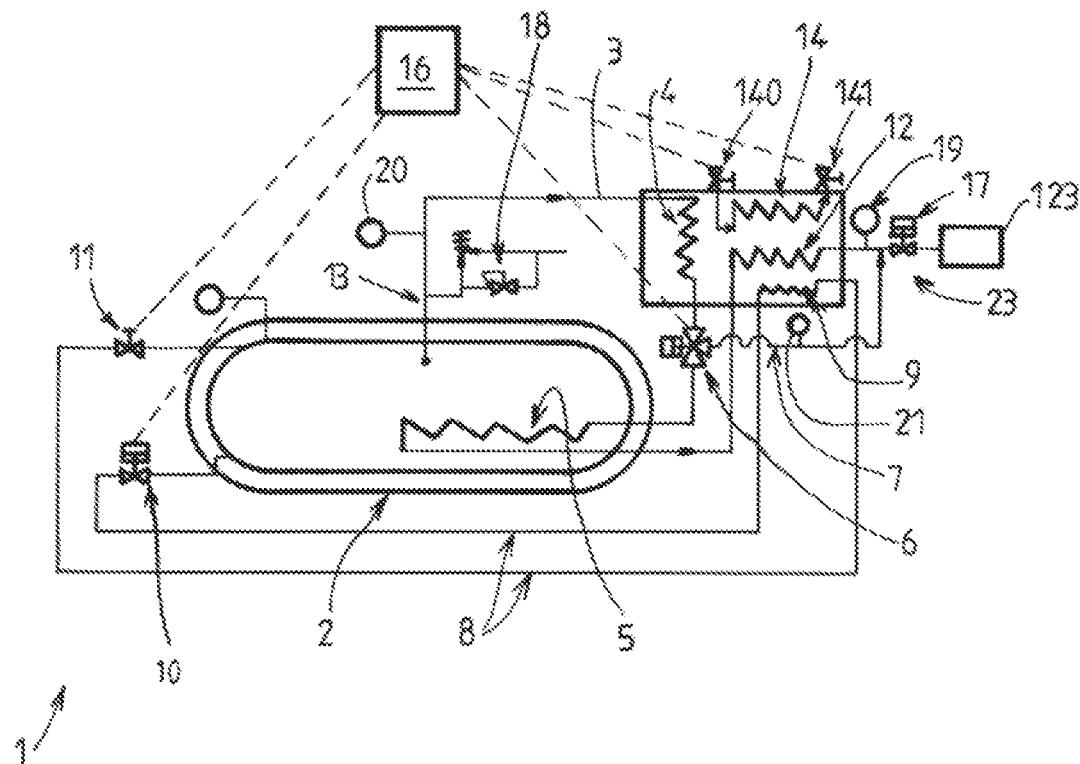

FLUID STORAGE AND SUPPLY DEVICE, AND VEHICLE AND METHOD COMPRISING SUCH A DEVICE

CROSS REFERENCE TO RELATED APPLICATIONS

This application is a § 371 of International PCT Application PCT/EP2022/058396, filed Mar. 30, 2022, which claims the benefit of FR21037762, filed Apr. 13, 2021, both of which are herein incorporated by reference in their entireties.

FIELD OF THE INVENTION

The invention relates to a fluid storage and supply device, to a vehicle and to a method comprising such a device.

BACKGROUND OF THE INVENTION

The invention relates more particularly to a fluid storage and supply device, in particular an on-board device for storing hydrogen and supplying it to a user member, comprising a cryogenic tank for storing liquefied fluid, a withdrawal circuit comprising a first withdrawal line having a first, upstream end connected to the upper part of the tank and a second, downstream end intended to be connected to a user member, the first withdrawal line comprising a first heating heat exchanger located outside the tank and a second heating heat exchanger located inside the tank, the withdrawal circuit comprising an assembly of one or more valves that is configured to ensure the passage of a flow of fluid circulating from the first end to the second end, in the process entering the first heat exchanger and then the second heat exchanger or in the process entering solely the first heat exchanger without entering the second heat exchanger.

Such a device is described in document DE4329566A, for example.

The storage of hydrogen on board vehicles supplied with hydrogen fuel makes use of compressed gaseous hydrogen or hydrogen in liquid form.

If the stored capacities required are greater than 50 kg, on-board storage in liquid form is preferred. The liquid hydrogen is generally stored in a tank at low pressure (less than 13 bar absolute). At equilibrium, the temperature of the hydrogen is set by the pressure in the tank via the saturation curve between the liquid phase and the gaseous phase. This is applicable up to the critical point of the hydrogen, which occurs at a pressure slightly less than 13 bar absolute.

The liquid hydrogen is generally produced at a pressure close to atmospheric pressure, generally between 1.15 and 1.3 bar absolute, corresponding to a temperature of between 20.8 K and 21.2 K. It is transported and transferred into the on-board tank using cryogenic trucks and a filling station. Since the transport and transfer are sources of heat influx, the temperature of the hydrogen in the tank corresponds to a saturation pressure of about 2 bar absolute, or 22.9 K.

Fuel cells (or possibly hydrogen-powered internal combustion engines "ICE") operate in general at a pressure less than 2 bar absolute in the heart of the cell. However, for various operational reasons, most manufacturers require an interface pressure with the tank of between 3 and 7 bar absolute.

Since the full tank is initially at a lower pressure, it is then necessary to increase its pressure up to a pressure greater than that of the fuel cell (ICE) and to control this pressure as the gas is consumed. It is therefore necessary to include in the tank a means for controlling its pressure.

The abovementioned document provides a supply of pressurized gas in the tank. This makes the installation more complex. This mode of control is not used in industry likewise because of the large quantities of gas required.

Another solution consists in using an electric heating pin that is located preferably in the liquid phase of the tank and is configured for evaporating liquid in order to increase the pressure in the tank. This option has the advantage of being simple to implement but has the major drawbacks of being very difficult to repair in the event of breakdown (access to the tank) and of consuming some of the electric power of the cell.

SUMMARY OF THE INVENTION

In one embodiment, an aim of the present invention is to overcome all or some of the drawbacks of the prior art outlined above.

In an effort to overcome the deficiencies of the prior art discussed, supra, the device according to the invention, which is furthermore in accordance with the generic definition given by the preamble above, can include a system for pressurizing the tank, comprising a pressurization line separate from the withdrawal circuit and comprising two ends connected respectively to the upper part and the lower part of the tank, a vaporization heat exchanger and an assembly of one or more valves that is configured to allow liquid to be withdrawn from the tank, to be heated in the vaporization heat exchanger and to be reintroduced into the tank.

Furthermore, embodiments of the invention may comprise one or more of the following features:
- the assembly of one or more valves comprises a three-way valve, the ports of which are connected respectively to an outlet of the first heat exchanger, to an inlet of the second heat exchanger, and to the second end via a portion of the withdrawal circuit bypassing the second heat exchanger,
- the withdrawal circuit has a third heat exchanger disposed in series downstream of the second heat exchanger such that the third heat exchanger receives the flow that has passed into the second heat exchanger,
- the first heat exchanger and the third heat exchanger are housed in one and the same exchanger housing in a heat-exchange relationship with at least one flow of heat-transfer fluid,
- the first heat exchanger and the vaporization heat exchanger are housed in one and the same exchanger housing in a heat-exchange relationship with at least one flow of heat-transfer fluid,
- the first heat exchanger, the third heat exchanger and the vaporization heat exchanger are housed in one and the same exchanger housing in a heat-exchange relationship with at least one flow of heat-transfer fluid,
- the device has an electronic controller configured to control all or some of the assembly of one or more valves of the device,
- the device comprises a fuel cell connected at the second, downstream end,
- the device has a flow rate limiting and/or regulating member between the assembly of one or more valves and the second, downstream end.

The invention also relates to a vehicle, in particular a boat, comprising a device according to any one of the features mentioned above or below.

The invention relates also to a method for supplying fluid to a user member, by means of a device according to any one of the features mentioned above or below or an abovementioned vehicle, wherein the user member is connected to the second end of the withdrawal circuit, the method comprising a step of supplying fluid from the tank to the user member by withdrawing liquefied fluid from the tank via the first withdrawal line, the method being characterized in that, prior to the fluid supplying step, if the pressure within the tank is less than a determined threshold, the method comprises a step of pressurizing the tank via the system for pressurizing the tank up to a determined pressure level.

The invention may also relate to any alternative device or method comprising any combination of the features above or below within the scope of the claims.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

FIG. 1 shows a schematic and partial view illustrating the structure and the operation of a first exemplary embodiment of the invention, FIG. 2 shows a schematic and partial view illustrating the structure and the operation of a second exemplary embodiment of the invention.

DETAILED DESCRIPTION OF THE INVENTION

The fluid storage and supply device 1 illustrated may be a device which is on board a vehicle (boat or other vehicle) for storing hydrogen and supplying it to a user member, such as a fuel cell or a motor, for example.

The device 1 comprises a cryogenic tank 2 for storing liquefied fluid, for example a tank with two spaced apart walls with vacuum insulation between the two walls.

The device has a withdrawal circuit comprising a first withdrawal line 3 having a first, upstream end 13 connected to the upper part of the tank 2, and a second, downstream end 23 intended to be connected to a user member.

The first withdrawal line 3 comprises a first heating heat exchanger 4 located outside the tank 2 and a second heating heat exchanger 5 located inside the tank 2, preferably in the liquid part, that is to say in the lower part.

The withdrawal circuit comprises an assembly of one or more valves 6 that is configured to ensure the passage of a flow of fluid circulating from the first end 13 to the second end 23, in the process entering the first heat exchanger 4 and then the second heat exchanger 5 or in the process entering solely the first heat exchanger 4.

That is to say that the withdrawal circuit has a line in which the first heat exchanger 4 and the second heat exchanger 5 are disposed in series between the first end 13 and the second end 23 and a bypass portion connecting the outlet of the first heat exchanger 4 to the second end 23 without passing through the second heat exchanger 5.

The assembly of one or more valves 6 comprises for example a three-way valve, the ports of which are connected respectively to an outlet of the first heat exchanger 4, to an inlet of the second heat exchanger 5, and to the second end 23 via a bypass portion 7 bypassing the second heat exchanger 5. The three way valve 6 may be of the proportional type (with, for example, some of the fluid being directed to the second heat exchanger 5). Of course, any other type of valve(s) can be envisaged to ensure the routing or the distribution of the flows of fluid. For example, the three-way valve may be replaced by two two-way valves disposed respectively in the line supplying the second exchanger 5 and the bypass line 7.

As illustrated, the withdrawal circuit may have a third heat exchanger 12 disposed in series downstream of the second heat exchanger 5 such that the third heat exchanger 12 receives the flow that has passed into the first heat exchanger 4 and then into the second heat exchanger 5. A control and/or safety valve 17 is preferably provided downstream of the third heat exchanger 12 at the second end 23 (upstream of the user member 123). A temperature and/or pressure sensor may also be provided at the outlet of this heat exchanger 12 (similarly, a pressure sensor may be provided at 20 at the first end 13 of the withdrawal circuit).

Thus, the assembly of one or more valves 6 makes it possible to withdraw gas from the tank 2, which is circulated in the first heat exchanger 4 then in the second heat exchanger 5 and subsequently in the third heat exchanger 12 before the second end 23. As an alternative, the assembly of one or more valves 6 makes it possible to withdraw gas from the tank 2, which is circulated solely in the first heat exchanger 4 before arriving at the second end 23. It should be noted that a flow rate regulating and/or limiting member 21 is preferably provided in the circuit downstream of the assembly of one or more valves 6 and the second, downstream end 23, in the bypass portion 7 bypassing the third heat exchanger 12.

This member, which may be, for example, a calibrated orifice, allows the pressure losses in the heat exchanger(s) 5 and 12 in particular to be compensated for.

The first heat exchanger 4 and the third heat exchanger 12 may be housed in one and the same exchanger housing 15 in a heat-exchange relationship with at least one flow 14 of heat-transfer fluid (water or any other fluid).

As illustrated, preferably, a safety device 18 with a pressure relief valve is provided at the first end 13 so as to vent possible excess pressures from the tank 2.

The device 1 moreover comprises a system for pressurizing the tank 2, comprising a pressurization line 8 separate from the withdrawal circuit and comprising two ends connected respectively to the upper part and the lower part of the tank 2, a vaporization heat exchanger 9 and an assembly of one or more valves 10, 11 that is configured to allow liquid to be withdrawn from the tank 2, to be heated in the vaporization heat exchanger 9 and to be reintroduced into the tank 2. For example, two valves are disposed on either side of the vaporization heat exchanger 9.

Thus, this auxiliary pressurization system allows the initial pressurization of the tank and in particular the starting up of a fuel cell connected to the second end 23, without using the withdrawal circuit.

The embodiment of [FIG. 2] differs from that of [FIG. 1] in that the vaporization heat exchanger 9 is housed in the same exchanger housing 15 as the first heat exchanger 4 (and, where applicable, the third heat exchanger 12) and in a heat-exchange relationship with at least one flow 14 of heat-transfer fluid (via, for example, a circuit equipped with one or more valves 140, 141).

In this case, in order to vaporize the liquid in the vaporization heat exchanger 9, the latter may be placed in a heat-exchange relationship with a hotter fluid, with air, or by circulating hot water in at least one flow 14 of heat-transfer fluid.

It should be noted that, contrary to the schematic representation, preferably this same exchanger housing 15 is disposed beneath the tank 2.

A possible mode of operation of the device for supplying fluid to a user member 123 will now be described.

When the pressure in the tank 2 is less than a determined threshold, the three-way valve 6 can be configured to transfer the fluid withdrawn from the tank 2 (and heated in the first heat exchanger 4) into the second heat exchanger 5 (in order to supply heat energy in the tank 2 and therefore increase its pressure). This fluid is then reheated in the third heat exchanger 12 before being supplied to the user member 123.

When the pressure in the tank is greater than a determined level, the three-way valve 6 can be configured to transfer the fluid withdrawn from the tank 2 (and heated in the first heat exchanger 4), without it passing through the second heat exchanger located in the tank 2, towards the user 123 (preferably via a flow rate limiting member 21). In this mode, the liquid and gas phases can be kept in thermodynamic equilibrium, at the same temperature. Thus, in steady-state operation, the withdrawn gas in the tank 2 comes from the evaporation of liquid caused by the second heat exchanger 5. Since this gas has bubbled through the liquid present in the tank, it is in thermodynamic equilibrium with the liquid. The pressure in the tank 2 is therefore set by the temperature of the liquid and of the gas. This mode of operation therefore makes it possible to have a tank 2 in which the liquid is at the equilibrium temperature with the gas. In this case, if the tank is shaken, the mixture of the liquid and gas phase does not affect the pressure since they are at the same temperature.

As illustrated, an electronic controller 16 (comprising a microprocessor and/or a computer) may be provided and configured to control all or part of the assembly of one or more valves of the device.

This withdrawal at the gaseous portion is more advantageous than a liquid withdrawal since it allows better renewal of the gas phase. Moreover, it limits the thermal gradient of this phase, and consequently minimizes the deviation from the equilibrium between the liquid and the vapors of the phases.

The device therefore makes it possible to control the pressure in the tank 2 with a gaseous withdrawal and a loop for internal recirculation in the liquid phase, if appropriate. The device can be movable and in particular can be subject to rotations with respect to three axes (Oxyz) which are greater than five degrees° and accelerations along these axes which are greater than 0.5 g (which can result in liquid/gas mixtures, potentially giving rise to pressure instabilities in the devices of the prior art).

The device may be on board a boat, aircraft, truck at a fixed station or in the "full for empty" mode of use.

The device 1 advantageously has an auxiliary pressurization heater 9 for the initial pressurization of the tank and the starting up of the cell without withdrawal of fluid (before the mode of operation of permanent withdrawal described above).

Thus, the tank 2 is pressurized by the pressurization system separately from the withdrawal circuit preferably solely to ensure the starting up.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A fluid storage and supply device comprising:
   a cryogenic tank for storing liquefied fluid;
   a withdrawal circuit comprising:
      a first withdrawal line having a first, upstream end connected to the upper part of the tank and a second, downstream end intended to be connected to a user member, wherein the first withdrawal line comprises a first heating heat exchanger located outside the tank and a second heating heat exchanger located inside the tank;
      an assembly of one or more valves that is configured to ensure the passage of a flow of fluid circulating from the first end to the second end, in the process entering the first heat exchanger and then the second heat exchanger or in the process entering solely the first heat exchanger without entering the second heat exchanger;
   a system for pressurizing the tank, comprising:
      a pressurization line separate from the withdrawal circuit and comprising two ends connected respectively to the upper part and the lower part of the tank,
      a vaporization heat exchanger and
      an assembly of one or more valves that is configured to allow liquid to be withdrawn from the tank, to be heated in the vaporization heat exchanger and to be reintroduced into the tank, and
      wherein the first heat exchanger and the vaporization heat exchanger are housed in one and the same exchanger housing in a heat-exchange relationship with at least one flow of heat-transfer fluid.

2. The device as claimed in claim 1, wherein the assembly of one or more valves comprises a three-way valve, the ports of which are connected respectively to an outlet of the first heat exchanger, to an inlet of the second heat exchanger, and to the second end via a portion of the withdrawal circuit bypassing the second heat exchanger.

3. The device as claimed in claim 1, wherein the withdrawal circuit has a third heat exchanger disposed in series downstream of the second heat exchanger such that the third heat exchanger receives the flow that has passed into the second heat exchanger.

4. The device as claimed in claim 3, wherein the first heat exchanger and the third heat exchanger are housed in one and the same exchanger housing in a heat-exchange relationship with at least one flow of heat-transfer fluid.

5. The device as claimed in claim 4, wherein the third heat exchanger is also housed in the same heat exchanger housing and in a heat-exchange relationship with the at least one flow of heat-transfer fluid.

6. The device as claimed in claim 1, further comprising an electronic controller configured to control all or some of the assembly of one or more valves of the device.

7. The device as claimed in claim 1, further comprising a fuel cell connected at the second, downstream end.

8. The device as claimed in claim 1, wherein it comprises a flow rate limiting and/or regulating member between the assembly of one or more valves and the second, downstream end.

9. The device as claimed in claim 1, wherein the device is configured to store and supply hydrogen to a user.

10. A vehicle comprising a device as claimed in claim 1.

11. The vehicle as claimed in claim 10, wherein the vehicle is a boat.

12. A method for supplying fluid to a user member, by means of a device as claimed in claim 1, wherein the user member is connected to the second end of the withdrawal circuit, the method comprising a step of supplying fluid from the tank to the user member by withdrawing liquefied fluid from the tank via the first withdrawal line, the method being characterized in that, prior to the fluid supplying step, if the pressure within the tank is less than a determined threshold, the method comprises a step of pressurizing the tank via the system for pressurizing the tank up to a determined pressure level.

13. The method as claimed in claim 12, wherein the device is disposed within a vehicle.

* * * * *